United States Patent [19]

McNaull

[11] 4,091,968
[45] May 30, 1978

[54] FLUENT MATERIAL DISPENSER AND BUCKET THEREFOR

[75] Inventor: Tom M. McNaull, LaGrange, Ill.

[73] Assignee: International Harvester Company, Chicago, Ill.

[21] Appl. No.: 681,307

[22] Filed: Apr. 29, 1976

[51] Int. Cl.² .................................................. G01F 11/10
[52] U.S. Cl. ...................................... 222/282; 272/369
[58] Field of Search ............... 222/167, 193, 282, 330, 222/410, 369; 221/277, 211, 96, 254, 266; 111/80, 6–7.4; 209/95

[56] References Cited

U.S. PATENT DOCUMENTS

| | | | |
|---|---|---|---|
| 699,699 | 5/1902 | Newberry | 222/369 X |
| 1,527,128 | 2/1925 | Durovaux et al. | 222/167 |
| 2,729,365 | 1/1956 | Fettkether | 222/369 X |
| 3,093,268 | 6/1963 | Smith et al. | 222/167 |
| 3,136,660 | 6/1965 | Mueller | 222/369 X |
| 3,512,489 | 5/1970 | Coldren et al. | 111/80 X |
| 3,581,949 | 6/1971 | Conrad et al. | 222/167 |
| 3,616,973 | 11/1971 | Hartley | 222/330 |
| 3,637,108 | 1/1972 | Loesch et al. | 222/167 X |
| 3,742,877 | 7/1973 | Coffee | 111/6 |
| 3,804,436 | 4/1974 | Seifert | 222/193 X |
| 3,904,335 | 9/1975 | Watkins | 222/330 X |

Primary Examiner—Stanley H. Tollberg
Assistant Examiner—Fred A. Silverberg
Attorney, Agent, or Firm—Dennis K. Sullivan; F. David AuBuchon

[57] ABSTRACT

A fluent material dispenser, preferably for use in conjunction with a planter, is provided with a precision metering device having buckets which pick up material and dump it into a collector. The collector preferably has discrete axially spaced openings which communicate with separate discharge tubes to deposit material in remote locations. The axially elongated buckets are mounted on a rotor and dump at a substantially uniform rate per degree of rotor rotation, preferably having a radially inner flat wall and an arcuate radially outer wall disposed at a uniform radius about the leading edge of the inner wall. Preferably, the rotor is enclosed in a pressurized housing and air pressure is utilized to deliver the material through the discharge tubes, the air supply and rotor drive being operatively connected with sources as available on the associated planter.

40 Claims, 7 Drawing Figures

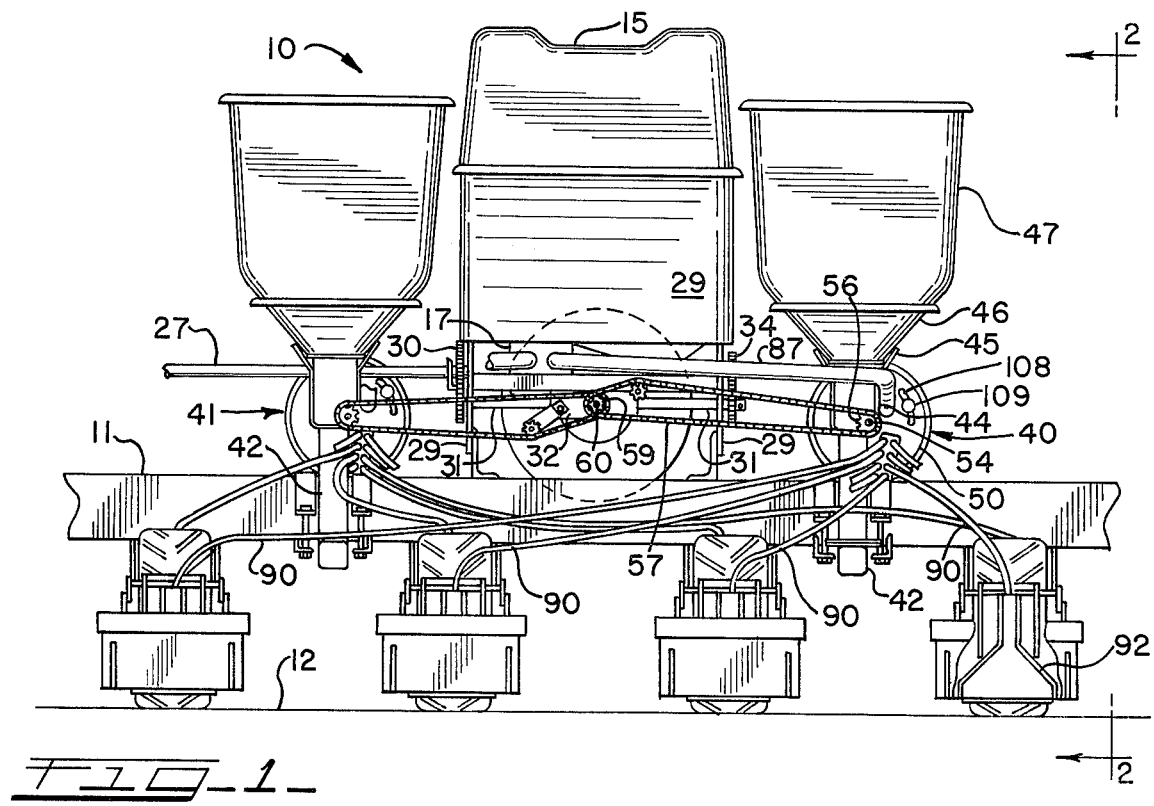
FIG_1_
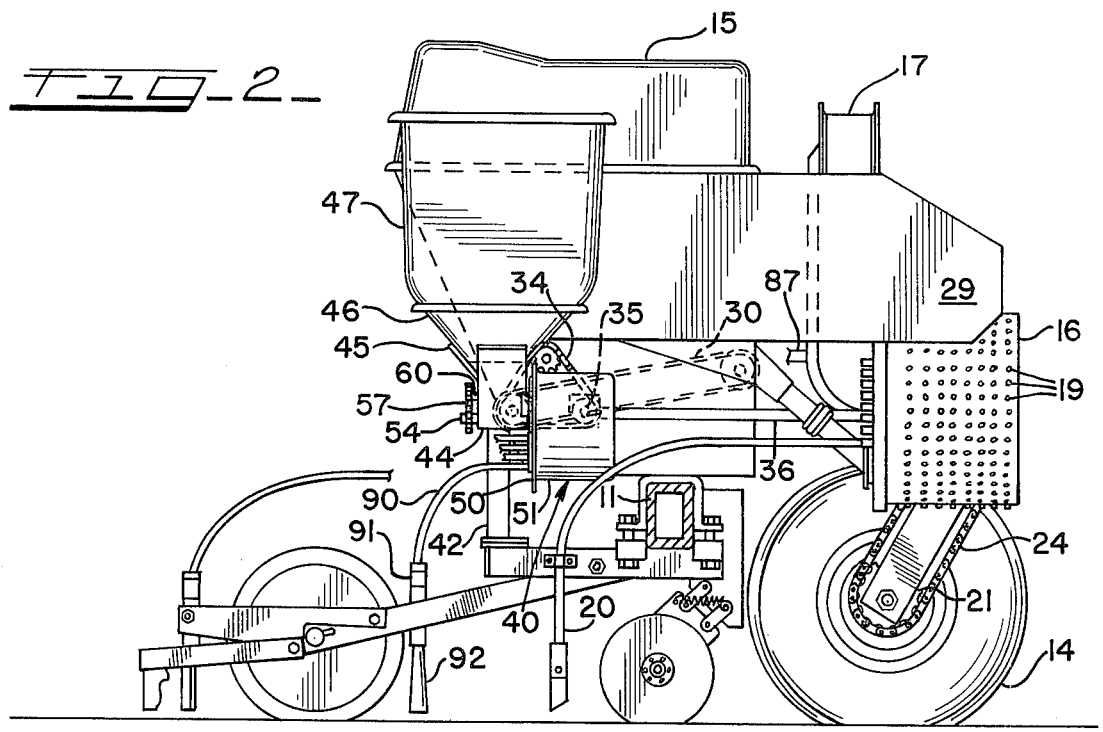
FIG_2_

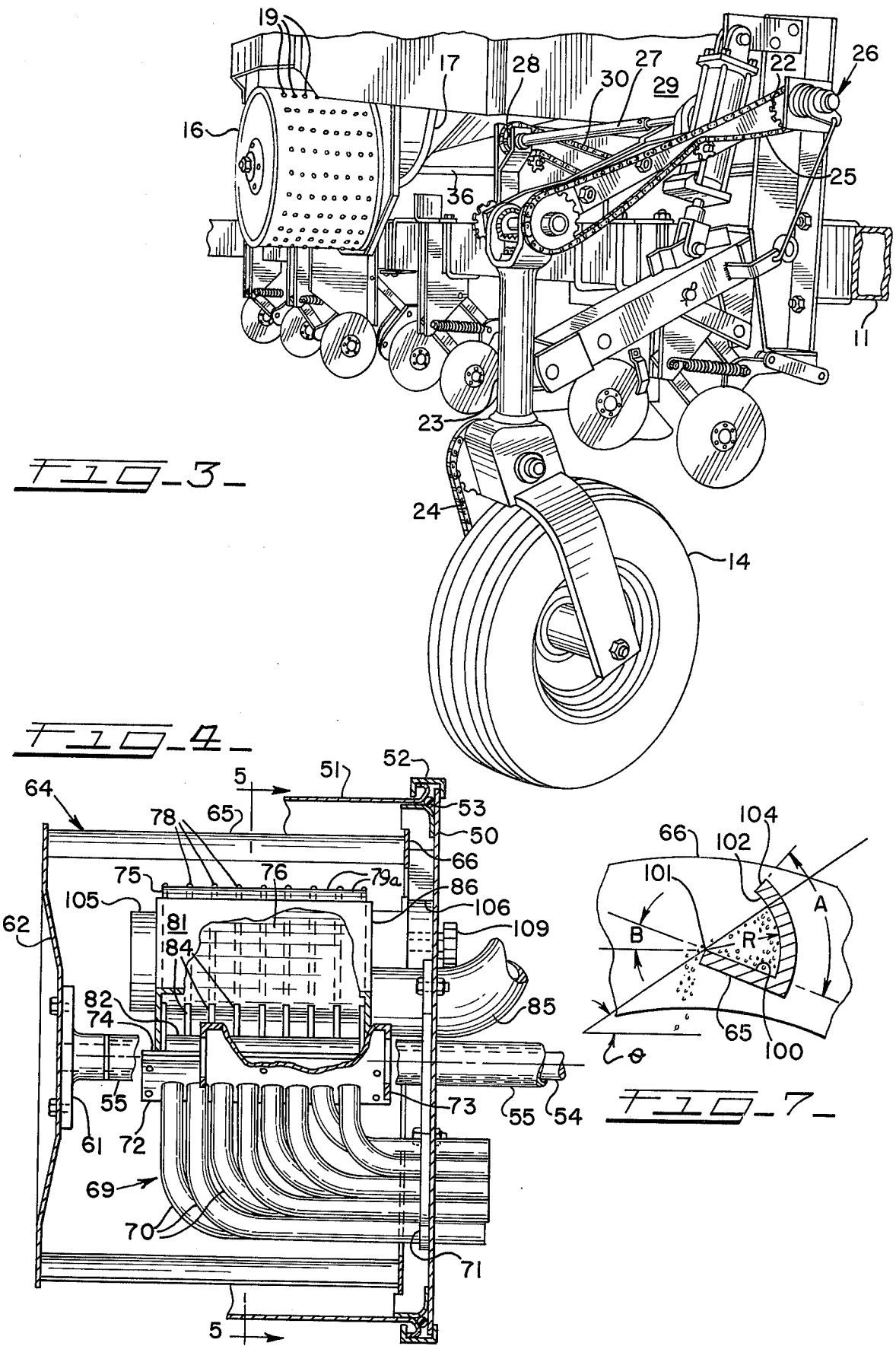

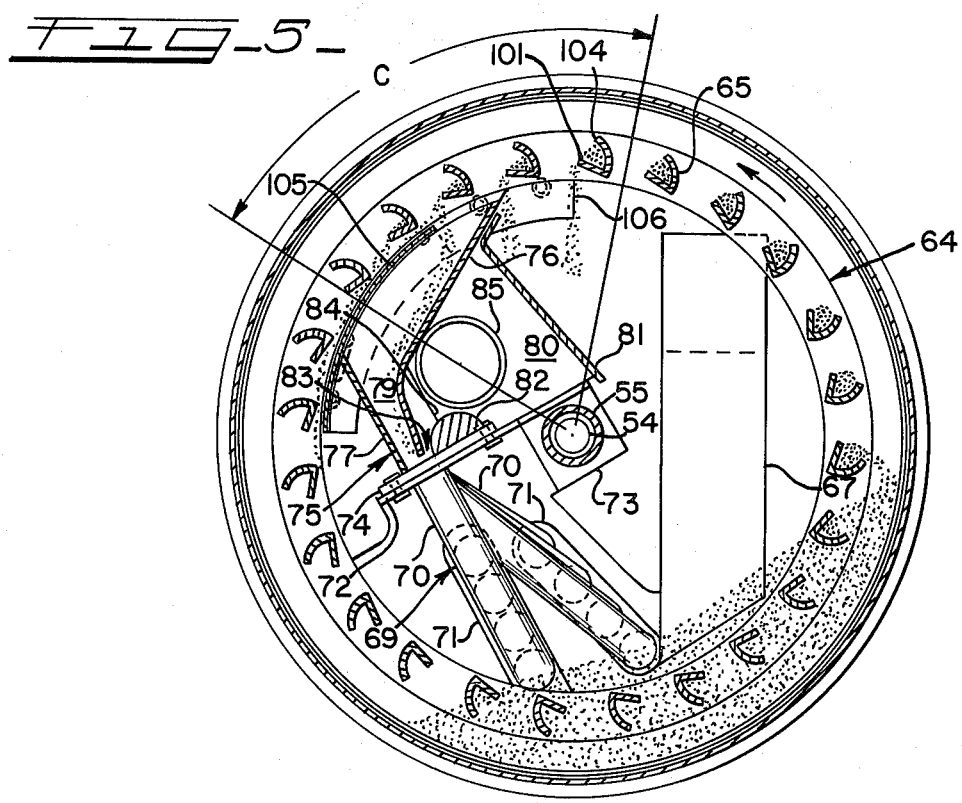
FIG-5-
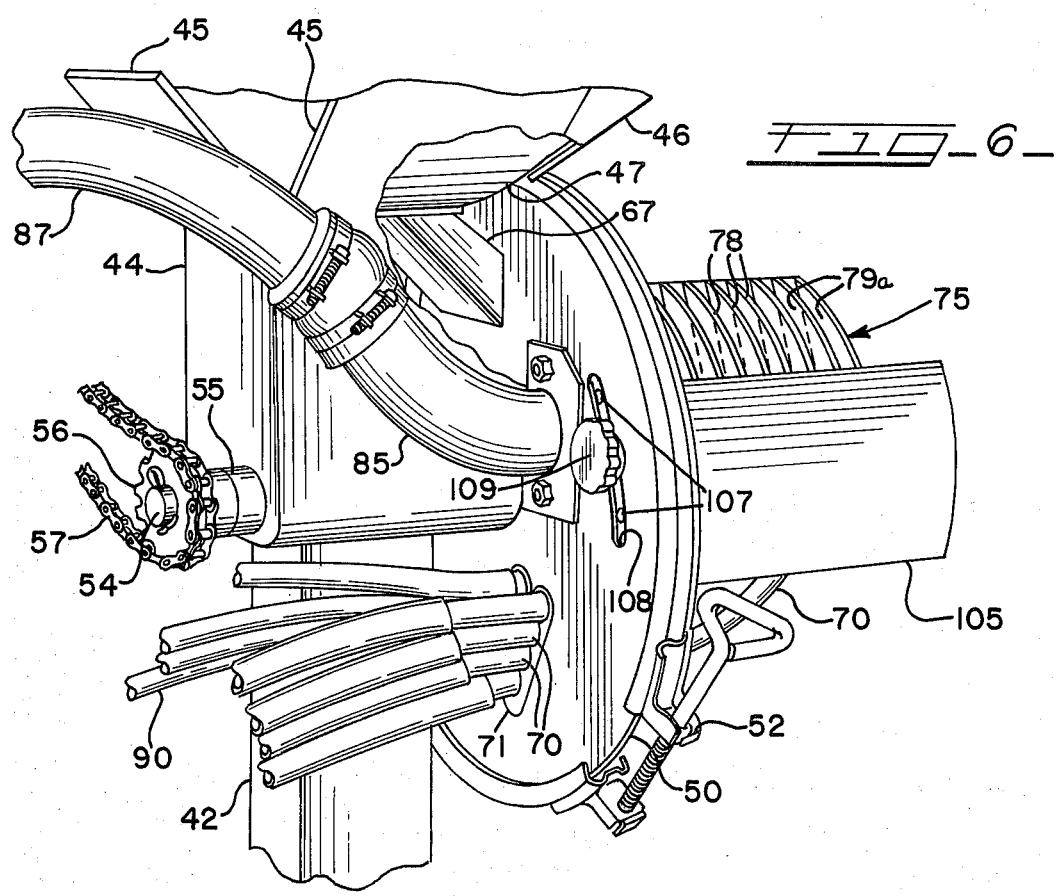
FIG-6-

FLUENT MATERIAL DISPENSER AND BUCKET THEREFOR

CROSS-REFERENCES TO RELATED APPLICATION

This application is related to application Ser. No. 681,306, filed Apr. 29, 1976, by Tom M. McNaull, Roland J. Frase, and Harold G. Meitl and assigned to the assignee hereof.

BACKGROUND OF THE INVENTION AND THE PRIOR ART

This invention relates to a precision metering device of the type having a bucket or series of buckets gravitationally discharging fluent materials into a collector and, more particularly, to a dispenser for fluent materials such as grains and seeds, fertilizers, herbicides, insecticides, inoculants, and other granular materials, especially for use in conjunction with a planter, incorporating the precision metering device and its novel bucket.

Oftentimes, in planting rows of seeds, such as corn, in a field, it is desirable to apply herbicides, insecticides, and fertilizers at the same time. Granular chemical distributors which have been used for this purpose generally have a hopper with a rotating trap chamber at the bottom. These devices are commonly mounted along the row trailing the planter devices and discharge by gravity through a distributor to lay a banded pattern. This was acceptable for planting a few rows. However, as the amount of rows being planted increased, for example to the sixteen row planters being sold today, it was still necessary to provide a hopper and trap chamber distributor for each type of chemical and for each row thereby greatly increasing the time necessary to fill the planter with chemicals for each row. Moreover, if the rate of discharge was to be adjusted, the adjustment had to be made at each distributor and increased the possibility of having nonuniform amounts of material being deposited in the various rows.

In the planting art, the Loesch et al. U.S. Pat. No. 3,637,108, and the Bauman et al. U.S. Pat. No. 3,860,146, teach a pneumatic planter, now embodied in the International Harvester Company CYCLO® planter, in which the seed is stored in a central hopper feeding into a pressurized perforated drum which carries the seed in the perforations up over a manifold collector whereat the perforations are closed off and the seed drops into the collector manifold for transport by air through tubes to each row. The farmer then had only one large hopper to fill with seed for distribution to as many as eight rows. However, for granular chemicals, he still had to fill the hopper at each row.

Other problems with the trap chamber dispensers are that the metering devices require an orifice or a positive displacement element with close tolerances, the individual units can become out of adjustment between rows, the material in the hopper can bridge the metering element or become lumpy, and that individual metering devices are required for each row. Further, granular materials can cause abrasive wear which may yield metering inaccuracies.

The Smith et al. U.S. Pat. No. 3,093,268 teaches a pneumatic fertilizer distributor having a metering device similar in some respects to that described and claimed herein. However, the Smith metering system does not have a axially divided collector which feeds individual rows but rather a single collector from which the fertilizer is blown into a discharge tube which apparently lays a single elongated band of material. Further, Smith teaches a rotating housing, which carries all of the fertilizer supply, having buckets mounted on its internal periphery. The rotating housing tends to make sealing difficult and carrying the entire fertilizer supply both limits the capacity and increases the power necessary to drive the device. Finally, the buckets described do not dump the material at a substantially uniform rate per degree of rotor rotation, which is a primary feature of the apparatus described herein and helps produce an even distribution of the material along the row.

SUMMARY OF THE INVENTION

Accordingly, a primary object of the invention described and claimed herein is to provide a bucket for a precision metering device which will dump fluent material at a substantially uniform rate per degree of rotation thereof.

Another primary object of the invention is provide a precision metering system especially for use in a fluent material dispenser, wherein a series of buckets rotate about an axis and dump material into a collector for further distribution.

Still another object of the invention is to provide a fluent material dispenser of the type described wherein the buckets are on a rotor within a nonrotatable sealed housing.

Another object of the invention is to provide a collector for said metering device having discrete axially spaced compartments which respectively collect portions of the material over a range of arcuate travel of the buckets for distribution from a central housing to respectively separate remote locations.

A more specific object is to provide a circumferentially slidable cover for the collector to vary the amount of material collected from each bucket.

Yet another object is to provide a fluent material dispenser wherein the housing is pressurized to pneumatically deliver the material to remote locations.

A more specific object of the invention is to provide a fluent material dispenser for use with a planter wherein the dispenser drive is driven from the planter drive.

Still another specific object of the invention is provide a fluent material dispenser for use with a planter having an air supply means wherein the air supply for the dispenser is connected with the planter air supply means.

Specifically, these and other objects of the invention are met in a fluent material dispenser, especially for use in distributing granular chemicals in conjunction with a planter and deriving its drive and air supply therefrom to the extent available, having a precision metering device including a central pressurized housing fed by an adjacent hopper and containing a horizontal rotor having axially elongated buckets thereon which pick up material and dump it over an arcuate interval into an axially elongated collector having discrete axially spaced passages having material collection openings therein, the collector having an adjustable cover to selectively limit the arcuate extent of the openings. Discharge tubes communicating exclusively respectively with each of the collector passages and extending externally of the housing pneumatically deliver the material to separate locations, preferably corresponding to the planted rows. The buckets are configured to produce a range of substantially uniform dumping per degree of rotor rotation, exceeding the range of collection to account for tilting of the dispenser, and have a cross-sectional configuration having a radially inner flat portion having a leading edge and a radially outer arcuate portion disposed at a radius about the leading edge.

The advantages of such a device are numerous. Among these are the centralized hopper and distributor which provides reduced filling time, enhanced reliability and simplicity by eliminating multiple drives, a single flow rate adjustment for all rows, thus providing uniform distribution thereto, a single moving part, and a system which lends itself to bulk handling equipment for filling and which is easily adaptable to folding implements. The rotor-bucket metering system does not require a metering orifice or a feed cup having close tolerances, continually tumbles and breaks down lumps in the material without pulverizing it, and positively shuts-off when the drive shaft is stopped. The use of a rotor within a fixed housing enhances sealing thereof, has a low torque requirement, and materially reduces the effects of abrasive wear from the material compared to conventional distributors. The use of a uniformly dumping bucket and the adjustable collector cover provides a linear adjustment of the rate of material flow to the rows without changing the ratio of rotor speed to ground speed.

DESCRIPTION OF THE DRAWINGS

Other objects and advantages of the invention will become apparent upon consideration of the detailed description and the drawings in which:

FIG. 1 is a rear view of a portion of a multiple row planter having two fluent material dispensers for granular chemicals incorporating Applicant's invention;

FIG. 2 is a side view partly in section of the planter of FIG. 1;

FIG. 3 is a front left perspective view of the planter of FIG. 1 illustrating the planter ground drive;

FIG. 4 is an axial sectional view of the fluent material dispenser of FIG. 1;

FIG. 5 is a diametrical sectional view of the material dispenser taken along the line 5—5 of FIG. 4;

FIG. 6 is an enlarged perspective view of the mounting of the dispenser of FIG. 1 on the planter frame; and FIG. 7 is an enlarged radial cross-sectional view of one of the buckets illustrated in FIG. 5.

DETAILED DESCRIPTION OF THE PREFERRED EMBODIMENT

Turning now to FIGS. 1, 2 and 3, there is shown the middle four rows of an eight row planter generally designated 10 mounted on a transverse tool bar 11 generally parallel with the ground 12 for forward travel on ground wheels, one of which is shown at 14, behind an associated tractor (not shown). The planter 10 is a pneumatic planter of the type illustrated in Bauman et al. U.S. Pat. No. 3,860,146, which is hereby incorporated by reference, and includes a central seed hopper 15 which feeds seed into a perforated rotatable drum 16 pressurized by an air supply means or fan in a housing 17 driven from the power take-off shaft of the pulling tractor (not shown). The planting means in this case comprises the rotating drum 16 in which a seed is carried on the inner side of each of the drum perforations 19 to the top side of the drum whereat the perforations are closed and the seed falls into an axially divided distributing manifold or collector (not shown) and is transported by air through discharge tubes, one of which is shown at 20 in FIG. 2 to the individual plant rows. The ground-synchronized drive for the seed drum 16 comprises the ground wheel 14 having an axle sprocket 21 (FIG. 2) which drives a sprocket 22 mounted on the tool bar 11 (FIG. 3) through a suitable drive mechanism including chains 24 and 25, a bevel gear drive in the wheel support 23 completing the driving connection between the chains 24 and 25. A clutch mechanism 26, which breaks the driving connection when the tool bar 11 is raised relative to the ground wheel 14, connects the sprocket 22 with a transverse drive shaft 27 extending from the sprocket 22 to a sprocket 28 adjacent the planter housing 29. Chain 30 extends from the sprocket 28 to drive a rear cross shaft 31 (FIGS. 1 and 2) which extends transversely through a right angle gear box 32 to a three sprocket chain drive 34 on the opposite side of the housing 29 driving a forward drive shaft 35 which drives the drum drive shaft 36 through a second right angle gear box.

It will be appreciated that with the exception of the right angle gear box 32, the foregoing planter and drive is known in the art. Although a specific type of planter is not necessary to achieve the broader aspects of the invention described and claimed herein, it will become apparent that when the invention is utilized in the distribution of granular chemicals during planting, a particularly advantageous combination is achieved in the above-described planter.

A pair of fluent material dispensers generally designated 40 and 41, for herbicide and insecticide respectively, are mounted on stanchions 42 attached to the tool bar 11 on either side of the planter housing 29. Since the dispensers 40 and 41 are identical, only the dispenser 40 will be described. A hollow base member 44 is welded at the top of the stanchion 42, the base member having an open front side and transverse and rearward sides which flare out as at 45 to receive a hopper base 46 in which an upright covered hopper 47 is mounted. Adjacent the forward side of the base member 44, a circular distributor housing base plate 50 is fixedly mounted in a vertical plane. A cylindrical distributor housing 51, having one closed end, has a flanged open end of the same diameter as the base plate 50 and is clamped thereagainst, with an "O" ring 53 inbetween, by ring clamp 52 to form a sealed nonrotatable housing. A horizontal rotor shaft 54 is rotatably mounted as by bearings in a fore-and-aft extending sleeve 55 mounted on the base member 44. The rearward end of the rotor shaft 54 is provided with a driving sprocket 56, a rotor drive chain 57 being entrained thereabout. The rotor drive chain 57 is driven from one of two sprockets 59 mounted on a stub shaft 60 extending rearwardly from the right angle drive 32 of the planter 10, the other sprocket (not shown) driving the dispenser 41.

A flange 61 is mounted on the forward end of the rotor drive shaft 54 near the closed end of the distributor housing 51 and a forward diametral plate 62 of a metering rotor 64 is bolted thereto. A plurality of buckets 65, mounted in equal spacing adjacent the circumference of the plate 62 and defining openings therebetween from the interior of the rotor to the exterior thereof, extend rearwardly, parallel to the rotor axis, to an annular plate 66 which interconnects the rearward ends of the buckets 65. The plates 62 and 66 and the axially elongated buckets 65 thus form the rotor 64 which rotates in the direction of the arrow shown on FIG. 5.

The radial cross-section of the buckets 65 will be described hereinafter.

The distributor housing base plate 50 is further provided with a filling tube 67 mounted therethrough and extending diagonally from the base of the hopper 47 to the lower interior portion of the distributor housing 51 terminating a distance short of the inner periphery of the rotor buckets 65 sufficient to maintain a high enough material level within the housing to ensure that the rotor buckets 65 will become completely filled as they are moved through the material when the rotor is turned. Due to the crystalline nature of granular materials, the end of the tube 67 will also prevent the material level from building up to excessive levels requiring additional power to move the rotor bucket 65 therethrough. Liquids, of course, would require a different form of level maintaining device.

Bolted to the base plate 50 is a manifold assembly 69 which comprises a number of discharge tubes 70, in this embodiment eight tubes, which extend through the base plate 50 in two four tube arrays, a sealing plate 71 being fastened to each four tube array to seal the respective openings in the base plate 50 therefor. The inner ends of the tubes 70 are axially disposed along and fastened to a mounting plate 72 disposed axially within the periphery of the rotor 64, the plate 72 having downturned tabs 73 which rotatably fit about the rotor shaft sleeve 55. The manifold assembly 69 thus has a fixed position within the rotor periphery.

Mounted on the axial manifold plate 72 by a base plate 74 and extending generally upwardly is a collector 75 which has an open arcuate material collecting area disposed near the inner periphery of the rotor buckets 65 for collecting material dumped therefrom over a substantial interval of arcuate travel of the rotor buckets, the collection area commencing at a rotationally forward collector wall 76 and terminating at a rotationally rearward wall 77 except, as will hereinafter be seen, the usual collecting interval may be variably limited by the cover 105. The collector 75 is divided axially by interior walls 78 into a plurality of equally spaced discrete material collection passages 79 having material collection openings 79a near the bucket periphery, which extend downwardly to communicate exclusively respectively with each of the tubes 70. Thus, an equal portion of the material falling off the axially elongated rotor buckets 65 will fall into the opening 79a of each of the collection passages 79 and the material collected in that passage will fall only into its respective tube 70.

The forward wall 76 and the rearwall wall 77 funnel downwardly toward the tubes 70. However, for reasons more fully disclosed in the referenced copending application, Ser. No. 681,306, it will be seen in FIG. 5 that the forward wall 76 extends downwardly inwardly of the opening of the tubes 70 thus funneling the material in the collection passages 79 to the rotationally rearward side of the tube entrances. The rotationally forward side of the tube 70 communicates with a plenum chamber 80 formed by a cover 81 extending from the upper portion of the wall 76 to the axial manifold plate 72 and enclosing both ends of the collector 75. The portion of the collector base plate 74 within the chamber 80 is provided with an axially extending half round member 82 spaced a small distance from the forward collector wall 76 and the lower portion of the interior walls 78 are extended as at 84 into the chamber 80 to form a downwardly directed passage 83 for air in the plenum chamber 80 to enter each tube 70, the convex surface of the half round member reducing the cross-sectional area of the passage 83 from the plenum chamber to the material collection passage 79 creating a slight venturi effect. Pressurized air is introduced into the plenum chamber 80 through a tube 85 extending through the rear cover wall 86 from the base plate 50, the air supply tube 85 being connected by tubing 87 (FIG. 1) extending from the base plate 50 to the housing 17 of the planter fan, a pressure reducing means, such as an orifice, being incorporated in the tubing 87 as necessary. The forward corner of the axial manifold plate 72 near the downturned tab 73 is cut away to allow the air in the plenum chamber 80 to pressurize the housing 51. The pressure in the housing 51 may be slightly lower than that in the plenum chamber 80 due to the above manner of air introduction and preferably is equal to or slightly greater than the pressure at the bottom of the passage 79 to prevent back flow therein.

Thus, the bulk of the air flow into the tube 70 enters from the plenum chamber 80 through the passage 83 rather than through the collection passage openings 79a wherein the material is introduced. As more fully discussed in the copending application, it is believed that when the discharge tube extensions 90 are of varying length, as would be common in a planter application, the higher rate of air flow through the shorter tubes would affect the distribution of materials between the openings 79a if the air were introduced into the tubes 70 therethrough rather than through the passages 83 as shown. Of course, if the metering device did not utilize air for transporting the material to a remote location, the plenum chamber 80 and passages 83 would be eliminated.

Attached to the ends of each of the tubes 70 external of the base plate 50 are discharge extension tubes 90 which extend to distal ends at the various planter rows whereat air diffusers 91, open to atmospheric pressure, of the type illustrated in Norris et al. U.S. Pat. application Ser. No. 547,314, filed Feb. 5, 1975, and now U.S. Pat. No. 3,964,639, may be incorporated if desired in the tube 90 prior to the material dropping into a triangular distributor 92 for laying the material on the ground in a band. It will be noted from FIGS. 1 and 2 that discharge tubes are provided for each row from each of the dispensers 40 and 41. Since the length of the discharge extension tubes 90 will vary depending on the distance of the row from the dispenser housing, it is preferable that the longer tubes be of a larger diameter to minimize differences in the air flow through the tubes.

Returning now to the metering device and referring primarily to FIGS. 5 and 7, it will be seen that the radial cross-section of the buckets 65 is configured to produce an interval of substantially uniform dumping per degree of rotor rotation and, to this end, comprises a radially inner flat or linear wall 100 having a rotationally leading edge 101 and an arcuate radially outer rotationally trailing wall 102 which is disposed at a substantially uniform radius R about the leading edge 101 from the junction of the walls 100 and 102 through an angle A to a rotationally trailing edge 104. The linear wall 100 may angle radially inwardly from the leading edge 101 at an angle B from the tangent of the rotor 64. It will be helpful in understanding the relationship of these angles to consider that, as the rotor 64 rotated in the direction of the arrow, a bucket 65 scoops up material in the bottom of the housing 51, the material being heaped in the bucket as it elevates. When the surface layer of the material is at an angle relative to the ground exceeding the angle of repose, $\frac{1}{2}\phi$, of the material, which is 35°–40° for most granular materials and nearly 0° for liquids (which would not be heaped), the heaped material will fall inwardly of the bucket periphery. At the point where a line drawn from the leading edge 101 at the trailing edge 104 of the bucket 65 is at the angle of repose of the material, dumping of the material actually contained in the bucket cross-section begins. Since the radius R of the bucket is uniform, the wedges of material falling out of the bucket 65 for each degree of rotation thereof will be of equal size until the leading linear wall 100 itself is at the angle of repose, at which point the bucket 65 will be exhausted of material. The point at which the bucket 65 is exhausted can be retarded by tilting the linear wall 100 radially inwardly from the leading edge 101 through the angle B. The rotational interval C over which substantially uniform dumping takes place and, as a result, the starting point of uniform dumping, is determined by the arcuate length of the wall 102 or the angle A, which is equal to the interval C. For example, in the embodiment illustrated, A equals 70° and B equals 20°. With an angle of repose of 38°, substantially uniform dumping from the bucket 65 starts at 12° before top center and ends at 58° after top center, the rotational interval C being 70°. The radius R controls the volume of the bucket.

The collector 75 is disposed relative to the rotor 64 to collect material only during the interval C of uniform dumping from the buckets 65. In order to regulate the amount of material dumped into the material collection openings 79a, a sheet material cover 105 is circumferentially slidably mounted by a base block 106 to the base plate 50. The cover 105 extends outwardly from the base plate 50 to lie adjacent the arcuate periphery of the collector 75 covering the rotationally trailing portion of all the openings 79a thereof. The base block 106 has a plurality of holes 107 aligned with an arcuate slot 108 in the base plate 50 and is retained thereagainst by a knob 109 having a threaded shaft which engages one of the holes 107 to draw the knob 109 against the exterior side of the base plate. Grossly, by selecting a hole 107, and finely, by sliding the cover 105 circumferentially, the collection openings 79a and thus the interval of collection of material dumped from the buckets 65 may selectively be varied thus varying the amount of material delivered to the row per revolution of the rotor, which is directly related to the ground speed of the planter 10. The remaining material dumped from the buckets deflects off the cover and returns to the bottom side of the housing 51. Because the rate of dumping from the buckets 65 per degree of rotation of the rotor is uniform, the adjustment achieved by moving the collector cover 105 will be substantially linear.

Since the planter 10 can be operated on slopes which would tilt the dispenser in the plane transverse of the rotor axis, it is preferable that the interval of uniform dumping from the buckets 65 exceed the maximum arcuate distance of the openings 79a permitted by the cover 105 by at least 10° on either side. It is believed that limited tilting in the axial plane will not effect the material distribution to the various rows provided sufficient material is in the housing 51 to completely fill the bucket 65. However, if this were a problem, the buckets 65 could be segmented axially although not necessarily with the same amount of segments as collector openings.

OPERATION OF THE PREFERRED EMBODIMENT

In operation, as the planter 10 is operated in the field, the planter drive shaft 36 will be rotated from the ground wheel 14 and the planter fan will be running by virtue to its driven connection with the pulling tractor. Due to its driven interconnection with the planter drive through the gear box 32, the rotor shaft 54 will rotate metering rotor 64 at a relatively low speed synchronized with the ground, preferably about 18 rpm at normal planting speeds. Similarly, the plenum chamber 80 is maintained at a positive pressure, preferably about 3 oz/sq.in (1.3kPa), by virtue of its connection with the housing 17 of the planter fan through the tubing 87 and pressure reduction means incorporated therein. Fluent materials in the hopper 47 are fed into the bottom of the distributor housing 51 through the filling tube 67 which maintains the material level therein. As the rotor 64 rotates in the direction of the arrow on FIG. 5, the buckets 65 are drawn through the material, become filled, and elevate the material toward the upper portion of the housing 51 dumping excess material along the way, first forward the outer side of the bucket periphery, then toward the inner side. When the leading edge 101 and trailing edge 104 of the buckets 65 are disposed along the angle of repose, $\theta$, of the material, the buckets will gravitationally dump the material radially inwardly of the bucket periphery at a substantially uniform rate per degree of rotor rotation until they are exhausted. Somewhat after the buckets being uniformly dumping, equal portions of material begin to be collected in the discrete axially spaced material collection openings 79a of the collector 75. This collection continues for a substantial arcuate distance of travel of the rotor buckets 65, up to about 45°, until the material deflects off the cover plate 105. The amount of material dumped by each bucket 65 into the collection opening 79a for one rotation is selectively varied by the circumferential position of the cover plate 105.

As the material drops through the collection openings 79a, it is funnelled down the collection passages 79 to the lower end thereof whereat air is introduced through the passages 83 from the plenum chamber 80. Both the air and the material in each passage 79 then enter the corresponding discharge tube 70 of the manifold assembly 69 and the material propelled by the difference in pressure between the collector ends and the distal ends through the discharge extension tubes 90 to the rows whereat the air pressure may be relieved, if desired, in the diffusers 91 and the material drops into the band distributors 92 which lay the material in a band along the row. Should the tool bar 11 be raised from the ground, as when completing a pass across the field, the drive to the planter 10 and the dispensers 40 and 41 is automatically terminated by the clutch assembly 26, thus terminating further dispensing.

It will be noted that the rotational speed of the rotor 64 is relatively low. This is done to minimize the effects of centrifugal force on the material and the horizontal velocity thereof which would traject it after it leaves the bucket, either of which could cause problems in attaining a uniform dumping rate per degree of rotation if not controlled.

It will be understood that while the invention has been described in connection with a granular chemical dispenser, certain aspects of the invention, such as the buckets and collector means could be utilized with other fluent materials, such as liquids, with some modification. For example, a much larger angle B would probably be necessary due to the low angle of repose of these materials.

Thus it is apparent that there has been provided, in accordance with the invention, a fluent material dispenser and bucket therefor that fully satisfies and objects, aims, and advantages set forth above. While the invention has been described in conjunction with a specific embodiment thereof, it is evident that many alternatives, modifications, and variations will be apparent to those skilled in the art in light of the foregoing description. For example, the collector 75 could have a number of collection passages 79 not connected with a discharge tube 70 so that various numbers of rows could be accommodated by merely changing the manifold assembly 69 and covering any resulting holes in the base plate 50. Accordingly it is intended to embrace all such alternatives, modifications, and variations as fall within the spirit and broad scope of the appended claims.

What is claimed is:

1. A fluent material dispensing apparatus comprising:
a housing for holding a supply of fluent material;
a rotor rotatably mounted about a generally horizontal axis within the housing for rotation relative thereto, said rotor having a plurality of axially elongated buckets disposed about the periphery thereof for scooping up the fluent material in the lower portion of the housing, elevating the material, and dumping the material over an interval of rotation in the upper portion of the housing upon rotatation of the rotor, the rotor having openings between the buckets from the interior of said rotor to the exterior thereof;
means for driving the rotor;
collector means mounted within said housing and having a plurality of passages having axially disposed circumferentially elongated openings positioned to receive a portion of the material dumped from the buckets;
means for varying the circumferential extent of said openings;
a plurality of discharge tubes in exclusive fluid communication respectively with each of the operative collector means passages, and having distal ends external of the housing; and
air supply means for maintaining a higher pressure at the collector means ends of the discharge tubes than at the distal ends for inducing the flow of air and material therethrough.

2. The invention in accordance with claim 1 and the housing being sealed during operation and means for supplying the material thereto from an adjacent hopper.

3. The invention in accordance with claim 1 and the housing being nonrotatable and the air supply means maintaining the interior of the housing at a positive pressure.

4. The invention in accordance with claim 3 and the housing being sealed during operation.

5. The invention in accordance with claim 1 and the rotor buckets being configured to dump into the collector openings at a relatively uniform rate per degree of rotation of the rotor.

6. The invention in accordance with claim 1 wherein said collector means openings are disposed to collect material over a substantial interval of travel of said rotor buckets.

7. The invention in accordance with claim 6 and said openings being axially adjacent each other.

8. The invention in accordance with claim 7 and said rotor buckets being configured to dump material into said openings at a substantially uniform rate per degree of rotor rotation over said interval.

9. The invention in accordance with claim 1 and the dispensing apparatus being mounted on a frame for travel relative to the ground, said rotor drive means rotating the rotor at a speed proportional to the ground speed such that the quantity of material discharged is proportional to the ground speed of said frame.

10. A fluent material dispensing apparatus comprising a housing for receiving fluent material; a rotor rotatably mounted about a generally horizontal axis within the housing, said rotor having a plurality of axially elongated buckets disposed about the periphery thereof for scooping up the fluent material in the lower portion of the housing, elevating the material, and dumping the material in the upper portion of the housing upon rotation of the rotor, the radial cross-section of the rotor buckets comprising a flat radially inner wall and an arcuate radially outer wall disposed radially about the leading edge of the inner wall to produce substantially uniform dumping per degree of rotor rotation of the material contained in said cross-section; means for driving the rotor; collector means mounted within said housing and having a plurality of passages having openings positioned to receive a portion of the material dumped from the buckets; a plurality of discharge tubes in exclusive communication respectively with each of the operative collector means passages, and having distal ends external of the housing; an air supply means for maintaining a higher pressure at the collector means ends of the discharge tubes than at the distal ends for inducing the flow of air and material therethrough.

11. The invention in accordance with claim 10 and the flat wall of the buckets being angled radially inwardly from the leading edge thereof to retard the ending point of said uniform dumping from said cross section.

12. The invention in accordance with claim 11 and the arcuate length of said arcuate wall controlling the interval of said uniform dumping from said cross-section.

13. The invention in accordance with claim 10 and said openings in said collector means being disposed to collect material over a substantial interval of rotation of said rotor buckets.

14. The invention in accordance with claim 13 and the range of said uniform dumping from said buckets being greater than said collecting interval of said collector means to accommodate a limited amount of tilting of said dispenser in a plane transverse of the rotor axis.

15. A fluent material dispensing apparatus comprising a housing for receiving fluent material; a rotor rotatably mounted about a generally horizontal axis within the housing, said rotor having a plurality of axially elongated buckets disposed about the periphery thereof for scooping up the fluent material in the lower portion of the housing, elevating the material, and dumping the material in the upper portion of the housing upon rotation of the rotor, the radial cross-section of the rotor buckets comprising a flat radially inner wall and an arcuate radially outer wall disposed radially about the leading edge of the inner wall to produce substantially uniform dumping per degree of rotor rotation of the material contained in said cross-section; means for driving the rotor; collector means mounted within said housing and having a plurality of passages having openings disposed to collect material dumped from the buckets over a substantial interval of rotation thereof; a plurality of discharge tubes in exclusive communication respectively with each of the operative collector means passages, and having distal ends external of the housing; an air supply means for maintaining a higher pressure at the collector means ends of the discharge tubes than at the distal ends for inducing the flow of air and material therethrough; and circumferentially movable cover means for selectively closing off a portion of said collector means openings to vary said collecting interval.

16. A granular material dispensing apparatus comprising a housing for receiving a supply of granular materials; a rotor rotatably mounted about a generally horizontal axis within the housing, said rotor having a plurality of elongated buckets disposed about the periphery thereof for scooping up the granular material in the lower portion of the housing, elevating the material, and dumping the material in the upper portion of the housing upon rotation of the rotor; means for driving the rotor; collector means mounted within said housing and having a plurality of passages having axially adjacent openings disposed to collect material dumped from the buckets over a substantial interval of travel thereof; circumferentially slidable cover means for covering a portion of said openings to limit the collecting interval; a plurality of discharge tubes in exclusive fluid communication respectively with each of the operative collector means passages and having distal ends external of the housing; and air supply means for maintaining a higher air pressure at the collector means ends of the discharge tubes and at the distal ends for inducing the flow of air and material therethrough.

17. In a granular material dispenser, said dispenser including a relatively low speed rotary element for scooping up a quantity of material, elevating the material and dumping the material inwardly of the periphery of the elements over an interval of rotation, and a collector for gravitationally receiving the material dumped from the elements over a range of arcuate travel of said rotary element, the improvement comprising bucket means circumferentially disposed on said element for dumping into said collector at a substantially uniform rate per degree of rotation of the rotary element over said range of arcuate travel.

18. The invention in accordance with claim 17 and the interval of said uniform dumping from said bucket means being greater than the receiving range of said collector to accommodate a limited amount of tilting of said dispenser in the plane transverse of the rotary element.

19. The invention in accordance with claim 17 and the collector being divided in the axial direction into plurality of discrete passages having openings near the bucket means periphery, each of the operative passages having a discharge tube in exclusive fluid communication therewith, said bucket means being axially elongated.

20. The invention in accordance with claim 19 and each of said openings being of equal width.

21. The invention in accordance with claim 17 and a sealed nonrotatable housing disposed about the rotating element and means for maintaining a positive pressure within the housing.

22. The invention in accordance with claim 21 and means supplying granular material to the housing from an adjacent hopper.

23. The invention in accordance with claim 22 and said material supply means being operative to limit the level of material in said housing to the lower portion thereof.

24. In a granular material dispenser, said dispenser including a relatively low speed rotary element having buckets circumferentially disposed thereon for scooping up a quantity of material, elevating the material and dumping the material inwardly of the periphery of the buckets over an interval of rotation, and a collector for gravitationally receiving the material dumped from the buckets over a range of arcuate travel of said rotary element, the improvement wherein the buckets are configured to dump into said collector at substantially uniform rate per degree of rotation of the rotary element over said range of arcuate travel, said buckets having a cross-sectional configuration in a plane transverse of the rotary element comprising a linear radially inner wall having a rotationally leading edge and a radially outer wall disposed at a substantially uniform radius about said leading edge.

25. A precision metering device for fluent materials comprising a horizontal axis rotor having a plurality of equally spaced buckets disposed circumferentially thereon to pick up material and gravitationally dump the material inwardly of the rotor periphery, said buckets having a radial cross-section comprising a radially inner linear wall having a leading edge and an arcuate radially outer wall joining said inner wall and disposed at a substantially uniform radius about said leading edge, and a collector disposed to receive material dumped from said buckets over a substantial interval of travel of said buckets.

26. The invention in accordance with claim 25 and said buckets being axially elongated.

27. The invention in accordance with claim 26 and said collector having a plurality of discrete axially spaced passages having collection openings for receiving said material.

28. The invention in accordance with claim 27 and a plurality of discharge means exclusively operatively connected with each of said collector passages for delivering collected material therefrom to separate locations.

29. A precision metering device for fluent materials comprising a horizontal axis rotor having a plurality of equally spaced buckets disposed circumferentially thereon to pick up material and gravitationally dump the material inwardly of the rotor periphery, said buckets having a radial cross section comprising a radially inner linear wall having a leading edge and an arcuate radially outer wall joining said inner wall and disposed at a substantially uniform radius about said leading edge, a collector disposed to receive material dumped from said buckets over a substantial interval of travel of said buckets, and a circumferentially movable cover to selectively close off a portion of said collector to vary the interval over which said material is collected by said collector.

30. The invention in accordance with claim 29 and said buckets dumping material only from said cross-sectional area during said interval and effecting a substantially uniform rate of dumping per degree of rotor rotation into said collector.

31. A bucket for gravitationally discharging fluent material contained therein upon relatively low speed rotation thereof relative to the ground at a substantially uniform rate per degree of rotation comprising a flat rotationally leading wall having an open leading edge and an arcuate rotationally trailing wall connected to said leading wall and disposed at a uniform radius about said leading edge and terminating at an open end, said uniform rate of discharge occurring over a period commencing when the angle of a line drawn through said leading edge of said flat wall and said open end of said trailing wall relative to the ground is equal to the angle of repose of said material and terminating upon exhaustion of the material in said bucket.

32. The invention in accordance with claim 31 and the axis of rotation of said bucket being remote therefrom.

33. The invention in accordance with claim 32 and the leading wall angling radially inwardly from the leading edge to retard the termination of material discharge.

34. The invention in accordance with claim 32 and said bucket comprising one of an equally spaced series of buckets disposed circumferentially about a rotor having a horizontal axis.

35. The invention in accordance with claim 31 and a collecting means operatively disposed to collect material from said bucket during a portion of said period of uniform rate of discharge.

36. The invention in accordance with claim 35 and said buckets being axially elongated, said collecting means comprising a plurality of discrete openings disposed in the axial direction.

37. The invention in accordance with claim 36 and said openings being in axial alignment.

38. The invention in accordance with claim 37 and said bucket comprising one of a series of buckets equally circumferentially spaced on a rotor, said collecting means being within the periphery of said buckets.

39. A bucket for gravitationally discharging fluent material contained therein upon relatively low speed rotation thereof relative to the ground at a substantially uniform rate per degree of rotation comprising a flat rotationally leading wall having an open leading edge and an arcuate rotationally trailing wall connected to said leading wall and disposed at a uniform radius about said leading edge and terminating at an open end, said uniform rate of discharge occurring over a period commencing when the angle of a line across said leading edge of said flat wall and said open end of said trailing wall relative to the ground is equal to the angle of repose of said material and terminating upon exhaustion of the material in said bucket, a collecting means operatively disposed to collect material from said bucket during a portion of said period of uniform rate of discharge, and means for selectively regulating said collecting means to control the angular extent of said portion of said period.

40. The invention in accordance with claim 39 and said regulating means comprising a circumferentially movable cover to close off a portion of said collecting means.

* * * * *